(12) United States Patent
Osakabe et al.

(10) Patent No.: US 9,131,102 B2
(45) Date of Patent: Sep. 8, 2015

(54) IMAGE READING APPARATUS PROVIDED WITH IMAGE SENSOR CONTAINED IN SLIDABLE CARRIAGE

(71) Applicant: Brother Kogyo Kabushiki Kaisha, Nagoya-shi, Aichi-ken (JP)

(72) Inventors: Yoshinori Osakabe, Seto (JP); Hiromi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/659,465

(22) Filed: Mar. 16, 2015

(65) Prior Publication Data

US 2015/0195420 A1 Jul. 9, 2015

Related U.S. Application Data

(63) Continuation of application No. 14/329,676, filed on Jul. 11, 2014, now Pat. No. 8,982,429, which is a continuation of application No. 13/627,252, filed on Sep. 26, 2012, now Pat. No. 8,780,415.

(30) Foreign Application Priority Data

Oct. 3, 2011 (JP) ................................. 2011-219219

(51) Int. Cl.
*H04N 1/10* (2006.01)
*H04N 1/00* (2006.01)

(52) U.S. Cl.
CPC ........... *H04N 1/103* (2013.01); *H04N 1/00522* (2013.01); *H04N 1/1043* (2013.01);
(Continued)

(58) Field of Classification Search
None
See application file for complete search history.

(56) References Cited

U.S. PATENT DOCUMENTS 4,870,502 A * 9/1989 Dreinhoff et al. ............. 358/474
5,778,277 A 7/1998 Wenthe, Jr. et al.
(Continued)

FOREIGN PATENT DOCUMENTS

CN 1416261 A 5/2003
CN 101552857 A 10/2009
(Continued)

OTHER PUBLICATIONS

Japan Patent Office, Notice of Reasons for Rejection issued for Japanese Patent Application No. JP 2011-219220 (foreign counterpart to above-captioned patent application), mailed Mar. 24, 2015.
(Continued)

*Primary Examiner* — Jeremiah Bryar
(74) *Attorney, Agent, or Firm* — Baker Botts L.L.P.

(57) ABSTRACT

An image reading apparatus includes: a contact glass setting a manuscript thereon; an image sensor extending in a first direction and having a reading surface which faces the contact glass for reading an image from the manuscript on the contact glass; a rail member extending inside the apparatus main body in a second direction perpendicular to the first direction; a carriage having a sensor container to contain the image sensor, a taper end portion formed in an end portion in the first direction to become smaller in height toward the end side, and an opening formed in the bottom of the sensor container on the taper end portion side; a biased portion adjacent to the reading surface of the image sensor in the second direction; and a biasing member biasing the image sensor toward the contact glass via the biased portion.

15 Claims, 10 Drawing Sheets

(52) U.S. Cl.
CPC ...... *H04N1/1061* (2013.01); *H04N 2201/0081* (2013.01); *H04N 2201/02402* (2013.01); *H04N 2201/02404* (2013.01); *H04N 2201/02429* (2013.01); *H04N 2201/02456* (2013.01); *H04N 2201/02477* (2013.01)

(56) References Cited

U.S. PATENT DOCUMENTS

| | | |
|---|---|---|
| 6,285,441 B1 | 9/2001 | Takahara |
| 6,453,140 B1 | 9/2002 | Hsu |
| 6,717,702 B1 | 4/2004 | Yamauchi et al. |
| 6,903,849 B2 | 6/2005 | Yokota |
| 6,952,292 B2 | 10/2005 | Takeuchi et al. |
| 7,218,427 B2 | 5/2007 | Hirayama |
| 7,557,967 B2 | 7/2009 | Amimoto et al. |
| 7,605,955 B2 | 10/2009 | Kakuta |
| 7,924,475 B2 * | 4/2011 | Suzuki ............ 358/474 |
| 7,978,380 B2 | 7/2011 | Ohama et al. |
| 8,159,725 B2 | 4/2012 | Cummings et al. |
| 2001/0040705 A1 * | 11/2001 | Yokota ............ 358/474 |
| 2001/0043371 A1 | 11/2001 | Takahara |
| 2002/0054380 A1 | 5/2002 | Takeuchi et al. |
| 2003/0142370 A1 | 7/2003 | Hanashi et al. |
| 2004/0012823 A1 | 1/2004 | Hendrix et al. |
| 2005/0270593 A1 * | 12/2005 | Ma ............ 358/474 |
| 2007/0002397 A1 | 1/2007 | Osakabe et al. |
| 2007/0002398 A1 | 1/2007 | Ohama et al. |
| 2007/0047023 A1 | 3/2007 | Oguri et al. |
| 2007/0109613 A1 | 5/2007 | Sakakibara |
| 2007/0146817 A1 * | 6/2007 | Osakabe ............ 358/474 |
| 2007/0165289 A1 | 7/2007 | Osakabe |
| 2008/0175640 A1 | 7/2008 | Akiyama |
| 2008/0304114 A1 | 12/2008 | Wu et al. |
| 2009/0034022 A1 | 2/2009 | Tamai |
| 2009/0244652 A1 | 10/2009 | Osakabe |
| 2010/0328736 A1 | 12/2010 | Ozawa |
| 2015/0043045 A1 | 2/2015 | Osakabe |

FOREIGN PATENT DOCUMENTS

| | | |
|---|---|---|
| JP | H08-163291 A | 6/1996 |
| JP | H11-069106 A | 3/1999 |
| JP | H11-289430 A | 10/1999 |
| JP | 2003-222955 A | 8/2003 |
| JP | 2007-043683 A | 2/2007 |
| JP | 2007-110466 A | 4/2007 |
| JP | 2008-154111 A | 7/2008 |
| JP | 2010-258543 A | 11/2010 |

OTHER PUBLICATIONS

European Patent Office, European Search Report for European Patent Application No. 12186024.1 (submitted as reference in related co-pending U.S. Appl. No. 14/525,006), mailed Mar. 8, 2013.

State Intellectual Property Office of the People's Republic of China, First Office Action issued for Chinese Patent Application No. 201210365224.3 (submitted as reference in related co-pending U.S. Appl. No. 14/525,006), mailed Jul. 30, 2014.

United States Patent and Trademark Office, First Office Action issued for co-pending U.S. Appl. No. 14/525,006 (related to above-captioned patent application), mailed Jan. 23, 2015.

European Patent Office, European Search Report for European Patent Application No. 12185771.8 (related to co-pending U.S. Appl. No. 14/329,676), dated Feb. 4, 2014.

State Intellectual Property Office of the People's Republic of China, The First Office Action for Chinese Patent Application No. 201210365263.3 (counterpart to co-pending U.S. Appl. No. 14/329,6760), mailed Jul. 28, 2014.

* cited by examiner

Fig. 1
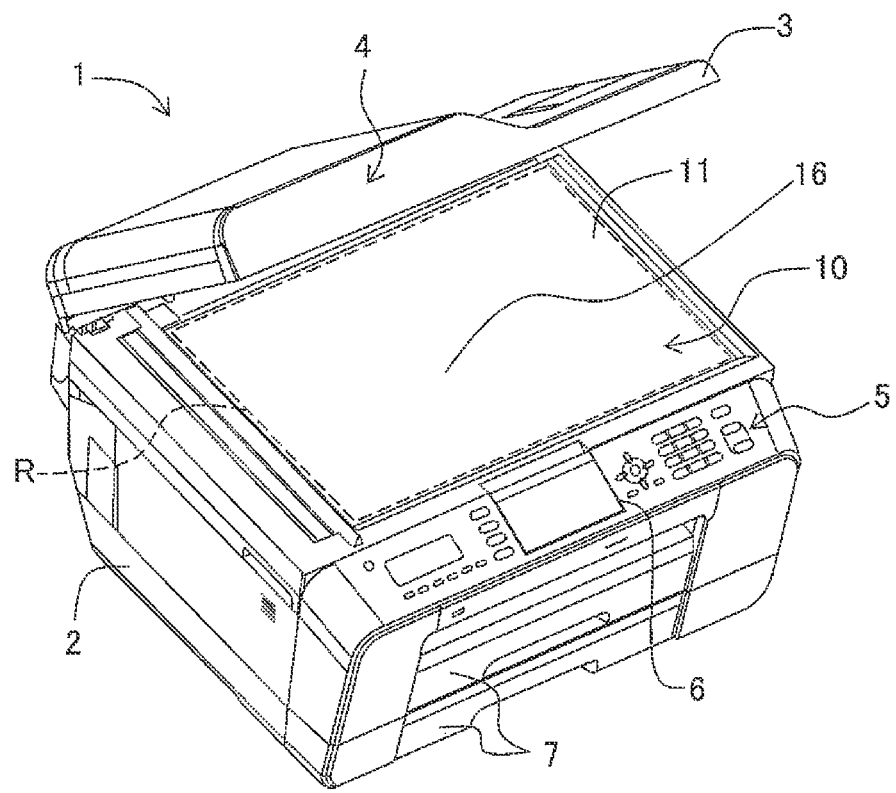
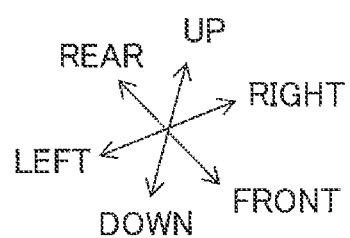

IMAGE READING APPARATUS PROVIDED WITH IMAGE SENSOR CONTAINED IN SLIDABLE CARRIAGE

CROSS REFERENCE TO RELATED APPLICATION

The present application is a continuation of U.S. patent application Ser. No. 14/329,676, filed on Jul. 11, 2014, which is a continuation of U.S. patent application Ser. No. 13/627,252, filed on Sep. 26, 2012, now U.S. Pat. No. 8,780,415 B2, issued on Jul. 15, 2014, which claims priority from Japanese Patent Application No. 2011-219219, filed on Oct. 3, 2011, the disclosures of which are incorporated herein by reference in their entirety.

BACKGROUND OF THE INVENTION

1. Field of the Invention

The present invention relates to an image reading apparatus which is configured to read an image from a manuscript on a contact glass by an image sensor contained in a carriage.

2. Description of the Related Art

Conventionally, as image reading apparatuses, so-called flatbed type image reading apparatuses have been known. Such an image reading apparatus has a contact glass at the upper surface of its main body for setting a manuscript. The image reading apparatus is configured to read an image of the manuscript set on the contact glass by an image sensor provided inside the main body. Then, the image sensor is installed on a carriage which is installed to be slidable on a rail provided inside the main body. The image sensor is configured to slide along the rail together with the carriage when reading the image of the manuscript.

As a configuration of such image reading apparatus, it is known that the image sensor has a longitudinal dimension in a main scanning direction and is placed on the carriage which is slidable along a guide shaft. Then, the image reading apparatus is configured to read an image of the manuscript set on the contact glass while sliding the image sensor, which is installed on the carriage, along the guide shaft.

In the abovementioned image reading apparatus, the carriage has a bearing on its lower surface in the central portion in the longitudinal direction. The bearing strides over the guide shaft from above to fit the guide shaft thereinto. By letting the bearing fit the guide shaft thereinto from above, the carriage is installed to the guide shaft to be slidable along the guide shaft.

Here, the bearing is formed on the lower surface of the carriage in the central portion in the longitudinal direction. Therefore, the carriage is supported by one point in the longitudinal direction of the carriage, namely the central portion at which the bearing is formed. Hence, the carriage is installed to the guide shaft swingably about the central portion in the longitudinal direction.

Then, the carriage is formed to have an open top box-like shape in which an upper surface on the contact glass side is open. The lower surface of the carriage is formed to have a uniform flat surface extending almost straight. Therefore, if the carriage swings about the central portion in the longitudinal direction, then one end portion of the carriage in the longitudinal direction moves up toward the contact glass, while the other end portion moves downward below the guide shaft.

When the carriage is installed to the guide shaft in the above manner, inevitably, the carriage swings with the guide shaft and the bearing being a center. Therefore, the above-mentioned image reading apparatus needs to secure a space occupied by the carriage when the carriage swings, which becomes an obstacle to facilitating miniaturization of the image reading apparatus.

Further, in the image reading apparatus, the distance between the manuscript on the contact glass and the reading surface of the image sensor exerts an influence on the reading quality of the image reading apparatus. Therefore, even when the carriage has swung with the central portion in the longitudinal direction being a center, it is still necessary to maintain the reading surface of the image sensor installed to the carriage parallel to the contact glass.

SUMMARY OF THE INVENTION

The present invention relates to an image reading apparatus which is configured to read an image from a manuscript on a contact glass by an image sensor contained in a carriage, and provides the image reading apparatus capable of maintaining the quality of reading images while facilitating miniaturization of the apparatus.

An image reading apparatus according to an aspect of the present invention has a main body, a contact glass, an image sensor extending in a first direction, a carriage, and a rail member supporting the carriage slidably in a second direction, and can read an image of a manuscript set on the contact glass by sliding the image sensor contained in a sensor container of the carriage, together with the carriage, along the rail member. Here, the carriage is supported to be swingable about the rail member at a central portion thereof in the first direction, and has a taper end portion and an opening in an end portion thereof in the first direction. Since the taper end portion is formed to be smaller in height toward the end side, when the carriage has swung about the rail member of the central portion in the first direction, it is possible to reduce the space occupied by the carriage in a swung state. Further, since the opening is formed on the taper end portion side, when the carriage has swung, an end portion of the image sensor can project downward below the bottom surface of the carriage. Therefore, the image reading apparatus can facilitate miniaturization of the apparatus by including the taper end portion and the opening in the end portion in the first direction. Further, in the image reading apparatus, the image sensor is biased toward the contact glass by a biasing member via a biased portion adjacent to a reading surface of the image sensor in the second direction, on the side of the taper end portion. Therefore, in the image reading apparatus, since the biasing member is not positioned between the image sensor and the sensor container, it is also possible to facilitate miniaturization of the apparatus. Further, in the image reading apparatus, since the carriage has the opening on the side of the taper end portion and the image sensor is biased by the biased portion and biasing member, even when the carriage has swung, it is still possible to keep a distance between the reading surface of the image sensor and the contact glass constantly. Hence, it is possible for the image reading apparatus to maintain the reading quality.

BRIEF DESCRIPTION OF THE DRAWINGS

FIG. 1 is a perspective external view of a multifunction apparatus according to an embodiment of the present invention.

DESCRIPTION OF THE PREFERRED EMBODIMENT

Figure 2:
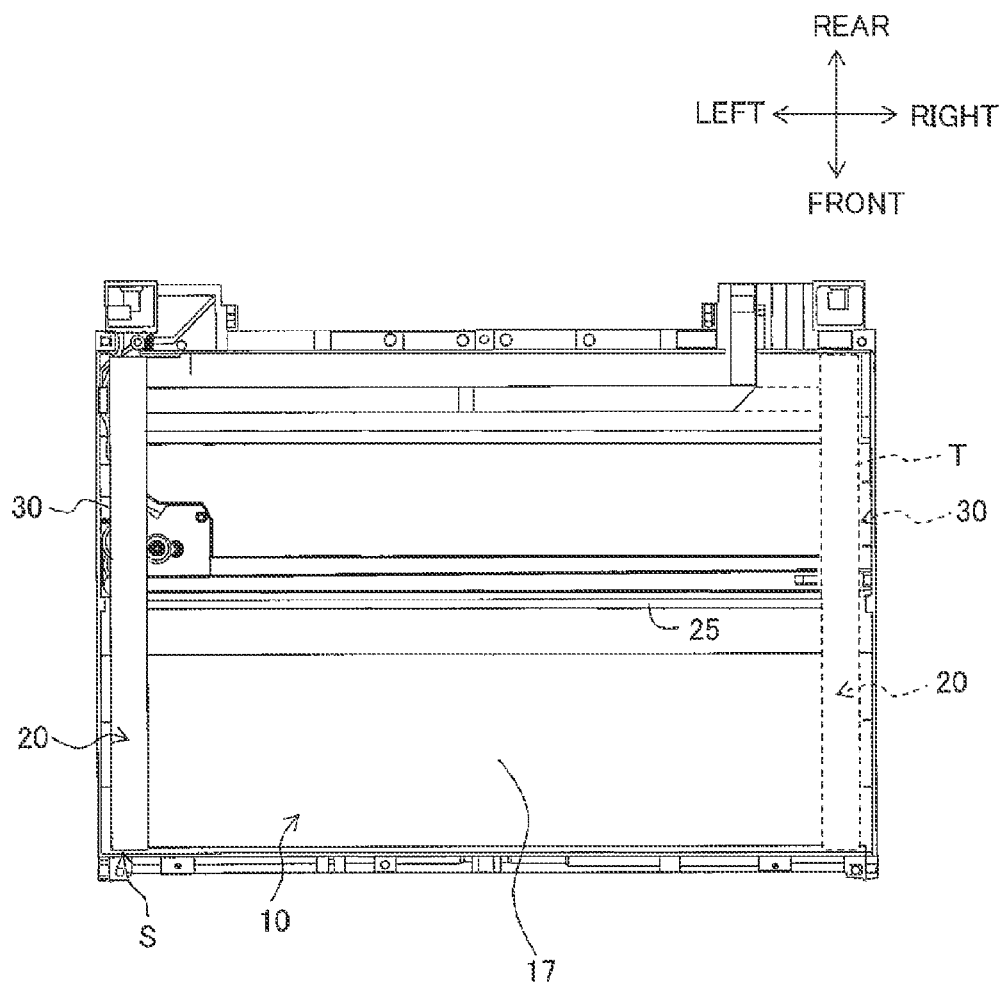
FIG. 2 is a plan view showing an inner structure of a scanner unit of the multifunction apparatus.

Hereinbelow, referring to the accompanying drawings, explanations will be made in detail with respect to an embodiment incorporating an image reading apparatus in accordance with the present invention into a multifunction apparatus 1 having a scanner unit 10.

First, referring to FIGS. 1 and 2, a schematic configuration of the multifunction apparatus 1 in accordance with the embodiment will be explained. Further, in the following explanations, with the multifunction apparatus 1 placed in a usable state as a reference, the up-down directions are defined as shown in FIG. 1. The lower right side in FIG. 1 is defined as the front side, and the upper left side in FIG. 1 is defined as the rear side. Further, with the multifunction apparatus 1 viewed from the front side as a left-right reference, the lower left side in FIG. 1 is defined as the left side, and the upper right side is defined as the right side.

As shown in FIG. 1, the multifunction apparatus 1 has a main body 2 and a top cover 3. The main body 2 has a manuscript table 11 on an upper surface of thereof. The manuscript table 11 has a contact glass 16. The contact glass 16 is a so-called "platen glass". The contact glass 16 is formed to have a rectangular shape slightly larger than maximum size of the manuscript which the multifunction apparatus 1 can read. Along side of the contact glass 16 is positioned along the left-right direction of the main body 2. The contact glass 16 is used when the manuscript is set on the contact glass 16 and an image is read by moving an aftermentioned image sensor 20 which constitutes a scanner unit 10.

Further, the main body 2 has the scanner unit 10 below the contact glass 16, namely, in an upper part of inner space of the main body 2. The scanner unit 10 has the image sensor 20, a carriage 30, a slide shaft 25, a reading transport motor, a flat cable, and the like. The scanner unit 10 reads an image of the manuscript set on the contact glass 16. The configuration of the scanner unit 10 will be explained in detail hereinafter in reference to the relevant figures.

Then, the main body 2 contains a control section, a facsimile section, an image formation section and the like below the scanner unit 10. The control section has a CPU, ROM, RAM, and the like. The control section plays a central role of the control for the multifunction apparatus 1 to realize a scanner function, a photocopy function, a printer function, and a facsimile function.

The facsimile section transmits the manuscript image read by the scanner unit 10 to the destination desired by a user via a network based on the control by the control section. Further, the facsimile section can receive facsimile data via the network. The control section controls the image formation section to print the received facsimile data on a sheet of printing paper or the like in a paper feed cassette 7. That is, the multifunction apparatus 1 realizes the facsimile function by controlling the scanner unit 10, the facsimile section, and the image formation section.

The image formation section prints the inputted image data onto the printing paper transported from the paper feed cassette 7 based on the control by the control section. The multifunction apparatus 1 controls the image formation section to process the image data corresponding to the image read by the scanner unit 10, thereby realizing the photocopy function. Further, the multifunction apparatus 1 controls the image formation section to process the print data inputted via the network, thereby realizing the printer function.

Further, an operation panel 5 and a liquid crystal display 6 are provided on the upper surface on the front side of the main body 2. The operation panel 5 is manipulated to input various instructions to the multifunction apparatus 1. The liquid crystal display 6 displays various kinds of information about the multifunction apparatus 1 to inform the user of the contents of the information.

Further, the paper feed cassette 7 is installed to the main body 2 to be insertable and removable through the front surface of the main body 2. The paper feed cassette 7 accommodates sheets of the printing paper as a recording medium in a stacked state. The printing paper is used to print the image formed by the image formation section.

Then, the top cover 3 is provided to be openable and closeable with the rear-end edge of the upper surface of the main body 2 as the axis. When the top cover 3 is closed, the top cover 3 covers the upper surface of the main body 2, i.e. the manuscript table 11 and the contact glass 16. Therefore, the top cover 3 can fix the manuscript, which is set on the contact glass 16, at that position.

Further, the top cover 3 has an auto document feeder 4 (ADF). The auto document feeder 4 is provided on the left side of the top cover 3. The auto document feeder 4 feeds the manuscripts in a manuscript tray (not shown) one by one consecutively and, after transporting the manuscripts along a predetermined transport path, discharges the manuscripts to a paper discharge tray (not shown). The multifunction apparatus 1 can read the image of the manuscript in a manner in which the scanner unit 10 reads the image in the course of transporting the manuscript by the auto document feeder 4.

Next, referring to FIG. 2, explanations will be made in detail with respect to a configuration of the scanner unit 10 of the multifunction apparatus 1. As described above, the scanner unit 10 has the image sensor 20, the carriage 30, the slide shaft 25, the reading transport motor, the flat cable, and the like. The scanner unit 10 is provided below the contact glass 16 in the upper part of the main body 2. Further, in this embodiment, the portion, in the main body 2, at which the scanner unit 10 is provided is parted by a scanner bottom surface 17 from a portion in which the facsimile section, the image formation section and the like are accommodated.

The image sensor 20 is configured by a so-called contact image sensor (CIS). The image sensor 20 reads the image of the manuscript positioned on the contact glass 16. The image sensor 20 has a reading surface 21 including an imaging element and the like at its upper surface positioned on the side of the contact glass 16. The image sensor 20 has a reading range with a length equivalent to the short side of the maximum manuscript size in the main scanning direction, i.e. the front-rear direction with respect to the main body 2. Further, the image sensor 20 is formed to have an approximately cuboid shape and to extend in the main scanning direction. The image sensor 20 is contained in an aftermentioned sensor container 31 of the carriage 30.

As shown in FIG. 2, the slide shaft 25 is a shaft member having a circular rod form. The slide shaft 25 is provided over or above the scanner bottom surface 17 to extend toward the left and right directions of the main body 2. The slide shaft 25 supports the image sensor 20 to be slidable in the left-right direction via the carriage 30. Then, based on the driving control by the control section, the reading transport motor can slide the image sensor 20 which is installed on the carriage 30 along the slide shaft 25 via a driving force transmission mechanism such as a pulley belt mechanism and the like.

Then, in the multifunction apparatus 1, the image sensor 20 is usually located in a so-called home position, i.e. a standby position S under the left end portion of the contact glass 16. As shown in FIG. 2, the image sensor 20 can slide along the lower surface of the contact glass 16 from the standby position S up to the position at a distance equivalent to the long side of the maximum manuscript size (to be referred to as "terminal position T" hereinbelow).

The image sensor 20 reads an image from the manuscript set on the contact glass 16 when the image sensor 20 is moved between the standby position S and the terminal position T along a secondary scanning direction parallel to the left-right direction of the multifunction apparatus 1. Therefore, as shown in FIG. 1, the scanner unit 10 has the maximum reading range R equivalent to the maximum-sized manuscript and can read an image of any manuscript not larger than the maximum manuscript size.

Next, referring to FIGS. 3 to 7, explanations will be made in detail with respect to a configuration of the carriage 30 accommodating the image sensor 20 in the scanner unit 10 according to this embodiment. As described above, the carriage 30 supports the image sensor 20 from below and supports the image sensor 20 to be slidable along the slide shaft 25 in the secondary scanning direction.

As shown in FIGS. 3 to 7, the carriage 30 includes the sensor container 31, a first taper end portion 32, a second taper end portion 33, a first opening 34, a second opening 35, first spring attachment portions 36, second spring attachment portions 37, and a shaft supporting portion 38. The carriage 30 extends in the front-rear direction of the multifunction apparatus 1. The sensor container 31 is formed to have a recess which is open toward the contact glass 16, and configured as a groove extending along the front-rear direction of the multifunction apparatus 1. The sensor container 31 contains the image sensor 20 so that the reading surface 21 of the image sensor 20 faces upward, i.e. toward the contact glass 16. The sensor container 31 supports the image sensor 20 from below.

Figure 7:
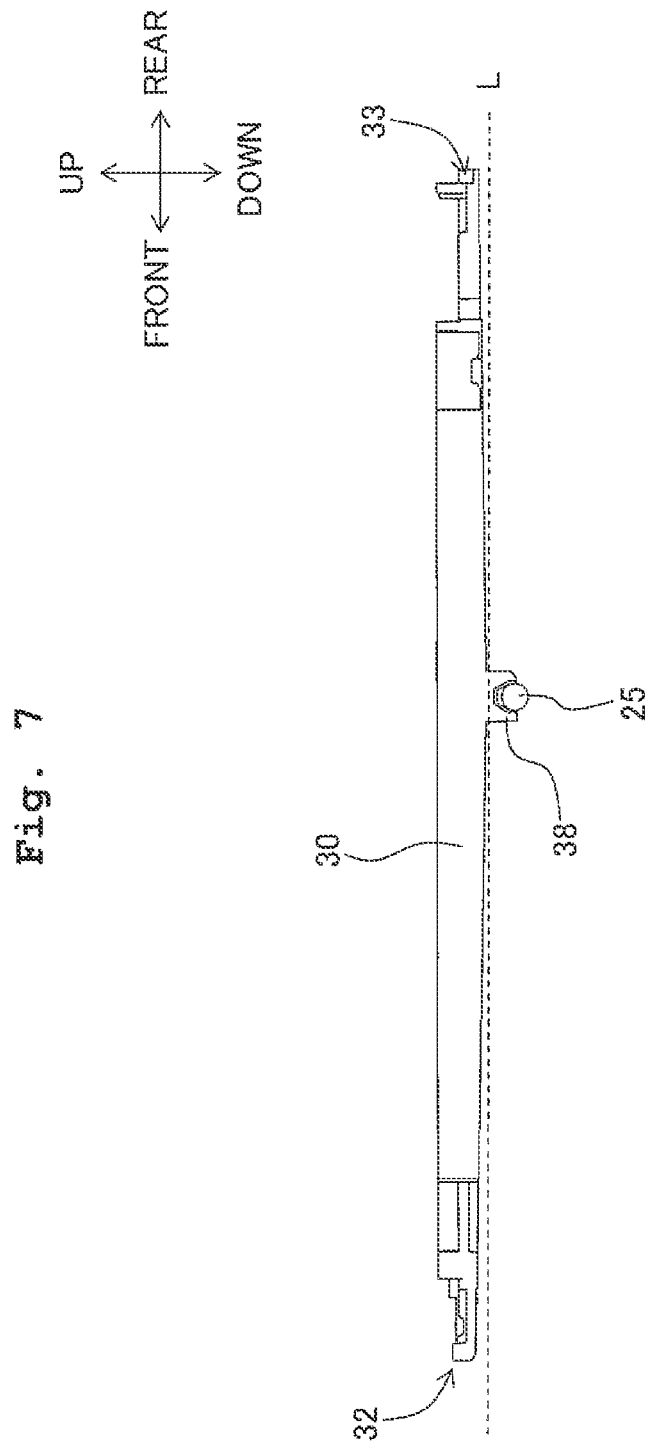
FIG. 7 is a side view of the carriage.

The first taper end portion 32 is one end portion of the carriage 30 on the front side in the longitudinal direction of the carriage 30. The first taper end portion 32 is formed such that the carriage 30 becomes smaller in height as getting closer to the one end portion from the central portion in the longitudinal direction. As shown in FIG. 7, the lower-end edge of the first taper end portion 32 is formed to be inclined upwardly as getting closer to the one end portion from the central portion in the longitudinal direction. Further, a reference line L in FIG. 7 shows the position of the lower-end edge of the central portion in the longitudinal direction of the carriage 30 in a state that the carriage 30 is in a horizontal state.

The second taper end portion 33 is the other end portion of the carriage 30 on the rear side in the longitudinal direction of the carriage 30. Similar to the first taper end portion 32, the second taper end portion 33 is formed such that the carriage 30 becomes smaller in height as getting closer to the other end portion from the central portion in the longitudinal direction. As shown in FIG. 7, the lower-end edge of the second taper end portion 33 is formed to be inclined upwardly with respect to the reference line L as getting closer to the other end portion.

Figure 4:
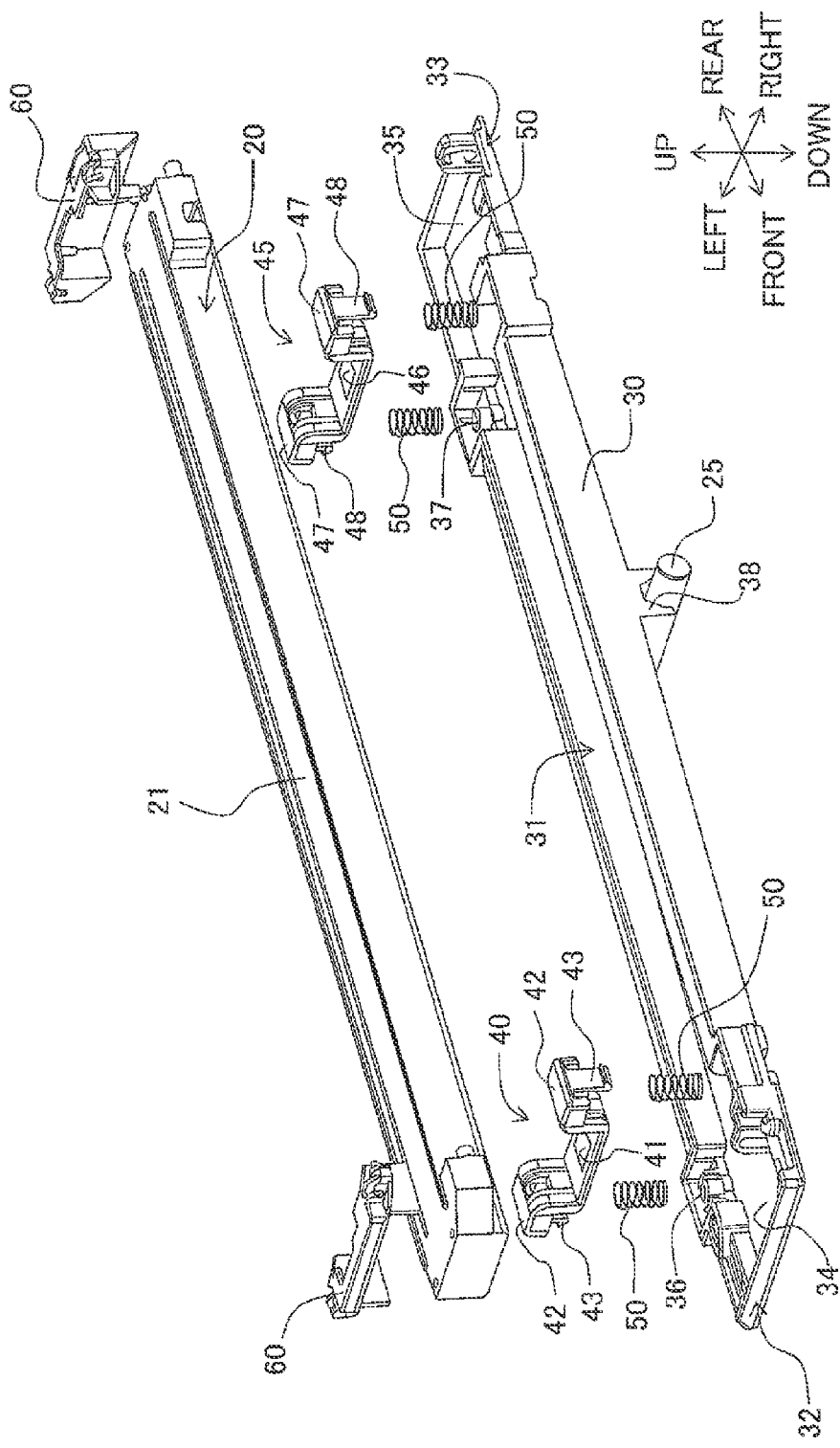
FIG. 4 is a perspective external view showing structures of the image sensor and the carriage.
Figure 6:
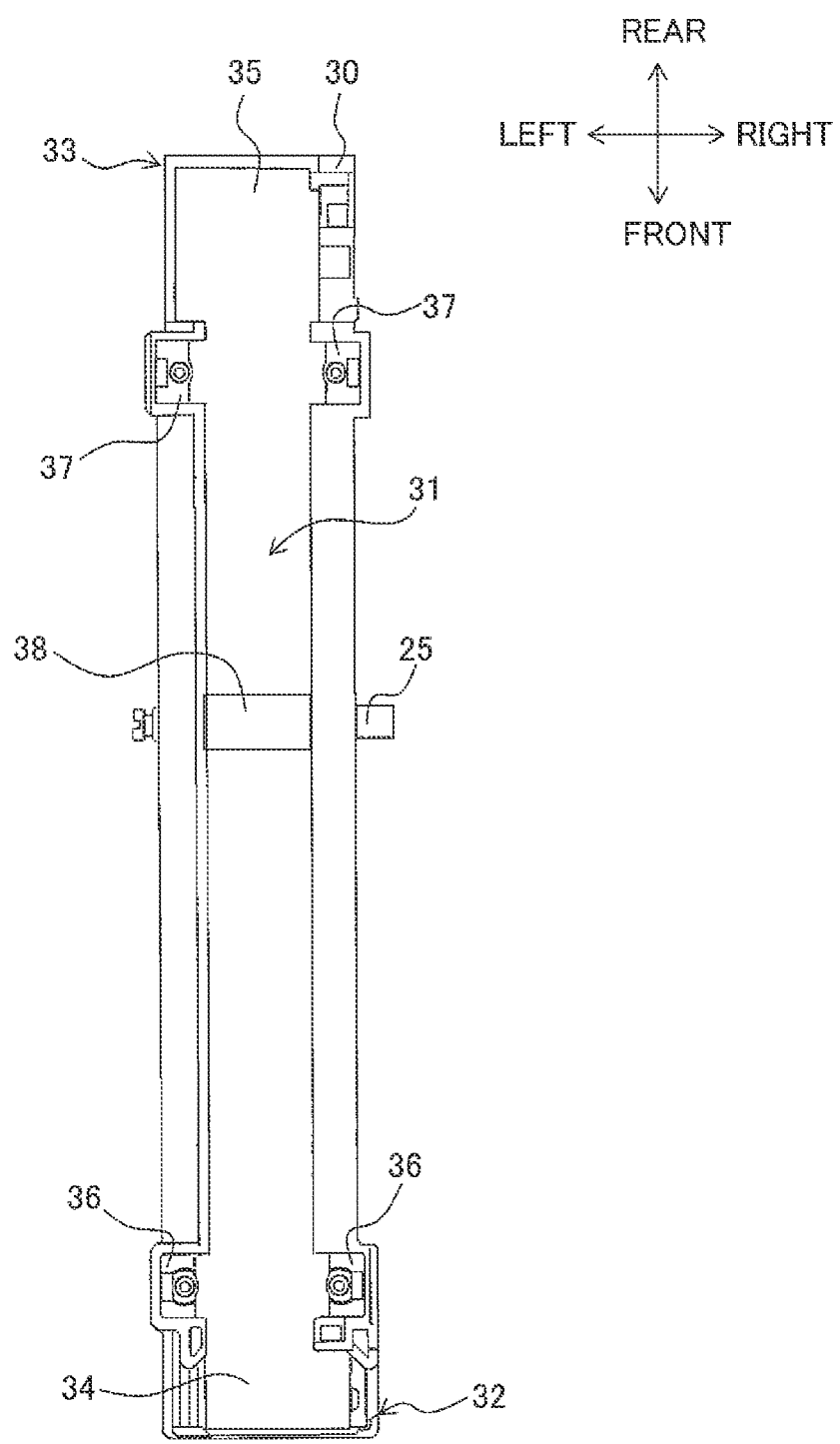
FIG. 6 is a plan view of the carriage.
Figure 8:
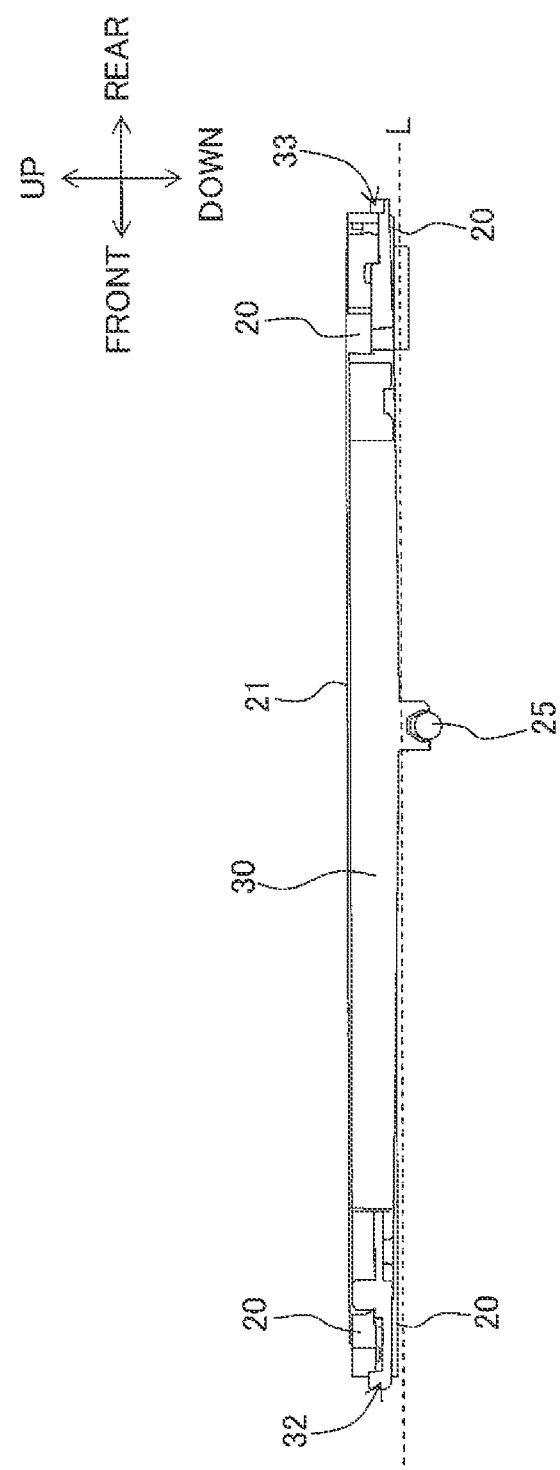
FIG. 8 is a side view of the image sensor and the carriage when the carriage is in a horizontal state.
Figure 9:
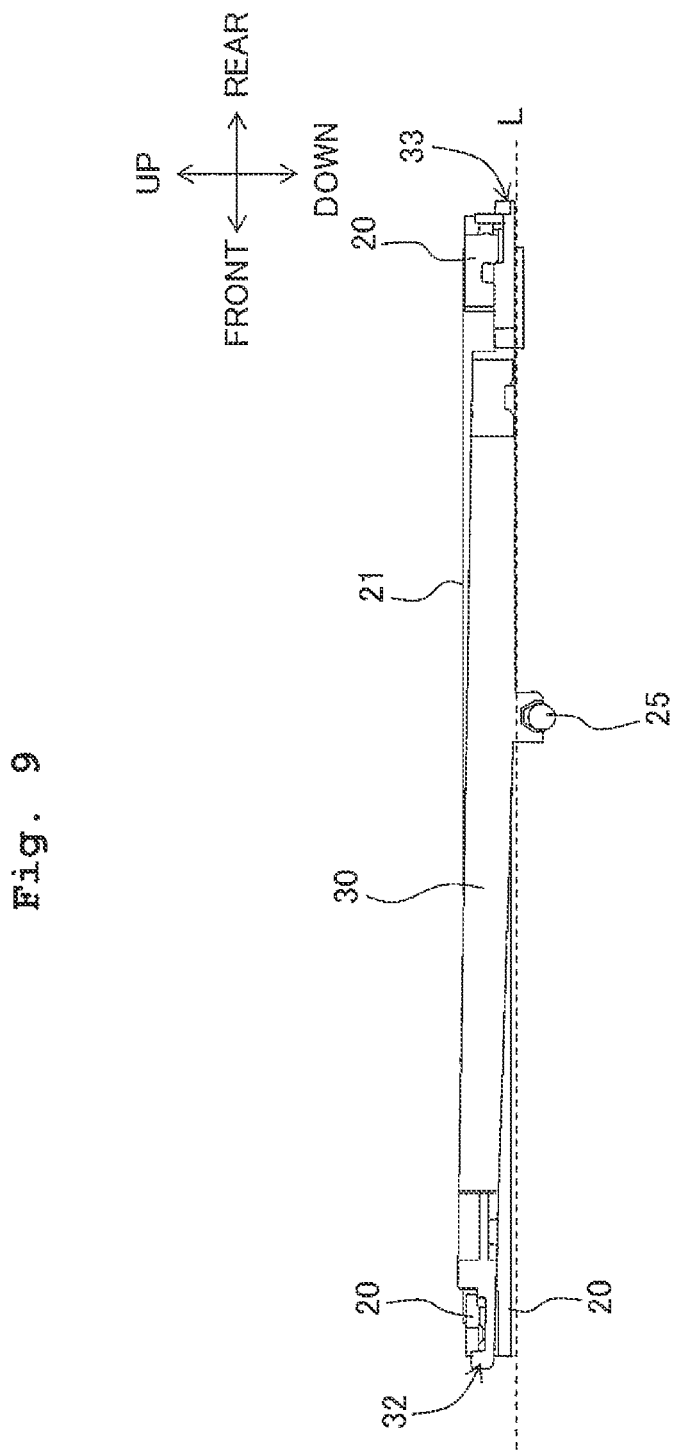
FIG. 9 is a side view of the image sensor and the carriage when the carriage is in a first inclined state.
Figure 10:
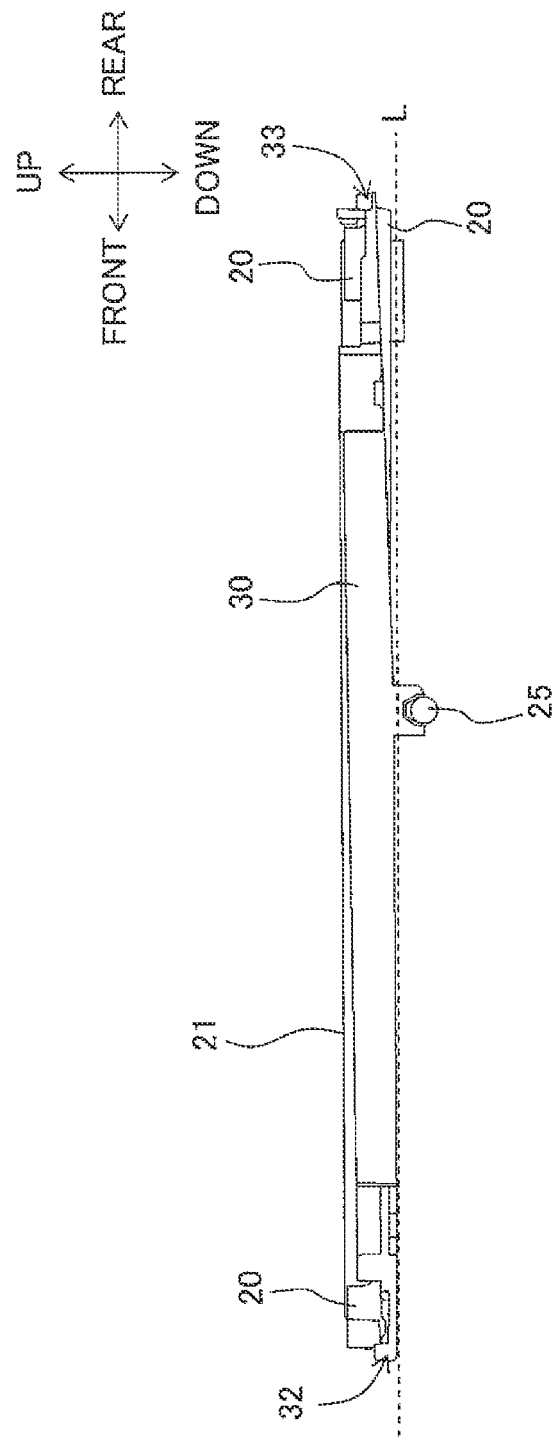
FIG. 10 is a side view of the image sensor and the carriage when the carriage is in a second inclined state.

As shown in FIGS. 4 and 6, on the side of the first taper end portion 32, the first opening 34 is formed to penetrate the bottom of the sensor container 31 in a vertical direction with respect to the bottom of the sensor container 31. The first opening 34 is opened to have a size from the shaft supporting portion 38 formed in the central portion to the first taper end portion 32, in the longitudinal direction of the carriage 30. With respect to the left-right direction of the carriage 30, the first opening 34 is opened to have the size wider than a width dimension of the image sensor 20 contained in the sensor container 31. Note that, the width dimension of the image sensor 20 means a dimension in the left-right direction of the image sensor 20 contained in the sensor container 31, i.e. the secondary scanning direction. As described above, the inside of the sensor container 31 is formed to be capable of containing the image sensor 20. Therefore, as shown in FIGS. 8 to 10, the front end of the image sensor 20 contained in the sensor container 31 can enter below the bottom of the carriage 30 via the first opening 34.

As shown in FIGS. 4 and 6, on the side of the second taper end portion 33, the second opening 35 is formed to penetrate the bottom of the sensor container 31 in a vertical direction with respect to the bottom of the sensor container 31. The second opening 35 is opened to have a size from the shaft supporting portion 38 formed in the central portion to the second taper end portion 33, in the longitudinal direction of the carriage 30. With respect to the left-right direction of the carriage 30, the second opening 35 is opened to have the size wider than the width dimension of the image sensor 20 contained in the sensor container 31 in. Therefore, as shown in FIGS. 8 to 10, the rear end of the image sensor 20 contained in the sensor container 31 can also enter below the bottom of the carriage 30 via the second opening 35.

The first spring attachment portions 36 are formed on the side of the first taper end portion 32 in the longitudinal direction of the carriage 30. The first spring attachment portions 36 are configured to be capable of attachment of a first holder member 40 and springs 50. As shown in FIGS. 3 to 6, the first spring attachment portions 36 are adjacent to the sensor container 31 and face each other in the secondary scanning direction of the multifunction apparatus 1 so that the sensor container 31 is sandwiched therebetween.

The second spring attachment portions 37 are formed on the side of the second taper end portion 33 in the longitudinal direction of the carriage 30. The second spring attachment portions 37 are configured to be capable of attachment of a second holder member 45 and other springs 50. As shown in FIGS. 3 to 6, similar to the first spring attachment portions 36, the second spring attachment portions 37 are adjacent to the sensor container 31 and face each other in the secondary scanning direction of the multifunction apparatus 1 so that the sensor container 31 is sandwiched therebetween.

The shaft supporting portion 38 is formed on the lower surface of the central portion in the longitudinal direction of the carriage 30. The shaft supporting portion 38 is installed to the slide shaft 25 from above so that the shaft supporting portion 38 strides over the slide shaft 25. The shaft supporting portion 38 supports the carriage 30 to be slidable along the slide shaft 25 in the secondary scanning direction. As shown in FIGS. 8 to 10, the shaft supporting portion 38 supports the carriage 30 to be swingable about the slide shaft 25.

Figure 5:
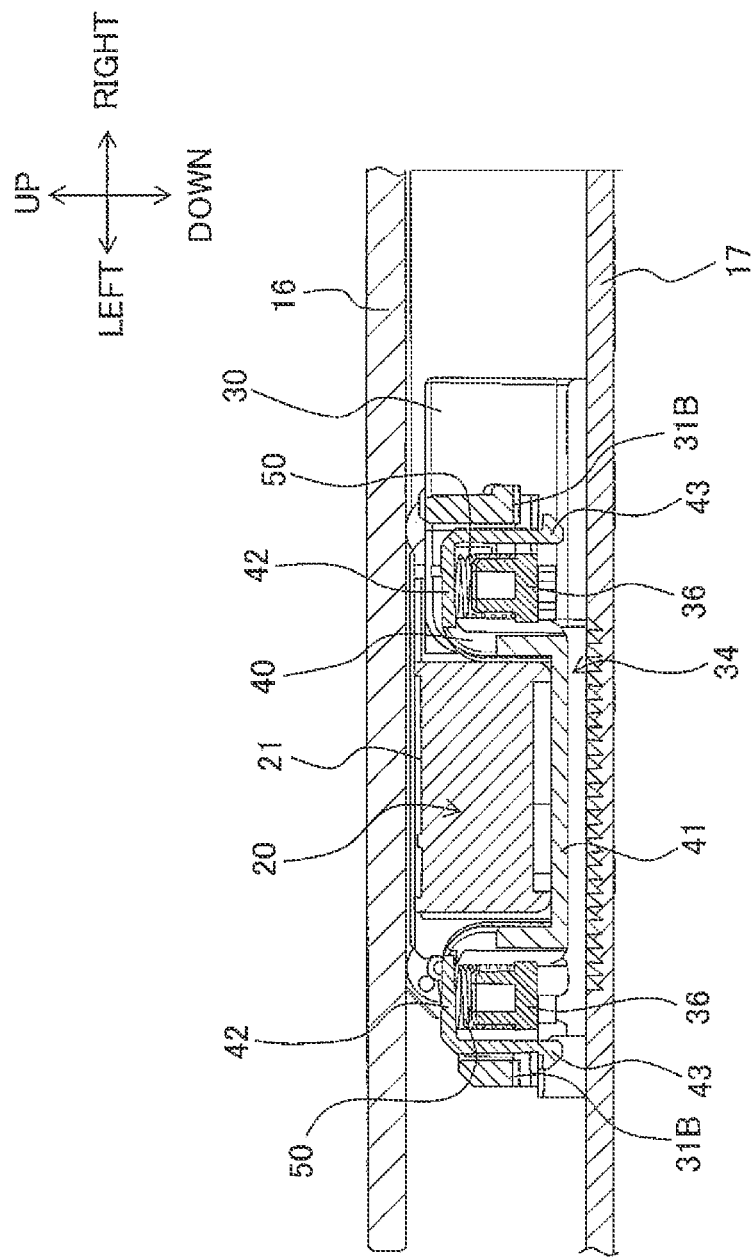
FIG. 5 is a cross-sectional view of a first holder member installed on the carriage.

As shown in FIGS. 4 and 5, the first holder member 40 supports the image sensor 20 contained in the sensor container 31 from below. The first holder member 40 holds the springs 50 between the first holder member 40 and the first spring attachment portions 36. The first holder member 40 has a sensor support portion 41, biased portions 42, and locking hooks 43.

As shown in FIGS. 4 and 5, similar to the sensor container 31, the sensor support portion 41 is formed to have a recess which is open upward. The sensor support portion 41 supports the lower surface of the image sensor 20 contained in the sensor container 31. Further, under a condition that the first holder member 40 is attached to the sensor container 31, the sensor support portion 41 traverses the first opening 34 in the secondary scanning direction at the position of forming the first spring attachment portions 36.

The biased portions 42 are formed to extend horizontally in outward directions with respect to the sensor support portion 41 from the two upper ends of the sensor support portion 41 formed to have the recess which is open upward. The biased portions 42 retain the end portions of the springs 50 attached to the first spring attachment portions 36 respectively. As shown in FIG. 5, under a condition that the first holder member 40 is attached to the carriage 30, the biased portions 42 are positioned above the first spring attachment portions 36, respectively. The biased portions 42 are biased upward by the springs 50 retained on the first spring attachment portions 36, respectively.

Further, the locking hooks 43 are hooks extending downward from the end edges of the respective biased portions 42 positioned outside of the sensor support portion 41. The locking hooks 43 have claw portions at the lower end portions to project toward outside, respectively. Then, by engagement with engagement holes 31B formed in the carriage 30, the locking hooks 43 fulfill the function of retaining the first holder member 40 to prevent the first holder member 40 from coming off the carriage 30.

As shown in FIG. 5, the engagement holes 31B are formed by cutting away the lower portions of the side walls of the carriage 30 on the left and right at the first spring attachment portions 36, respectively. Under a condition that the first holder member 40 is attached to the carriage 30, the claw portions of the locking hooks 43 enter into the engagement holes 31B. Therefore, if the first holder member 40 moves upward by the biasing force of the springs 50, then the claw portions of the locking hooks 43 come into contact with the upper ends of the engagement holes 31B. By these contacts, the first holder member 40 is retained in place without coming off the carriage 30, and thereby it is possible to prevent loss of the first holder member 40.

As shown in FIG. 4, the second holder member 45 supports the image sensor 20 contained in the sensor container 31 from below. The second holder member 45 holds the other springs 50 between the second holder member 45 and the second spring attachment portions 37. The second holder member 45 has a sensor support portion 46, biased portions 47, and locking hooks 48. The configuration of the second holder member 45 is the same as that of the first holder member 40, and the sensor support portion 46, the biased portions 47 and the locking hooks 48 also functionally correspond to the sensor support portion 41, the biased portions 42 and the locking hooks 43 of the first holder member 40, respectively. Accordingly, explanations will be omitted with respect to the sensor support portion 46 and the like of the second holder member 45.

The springs 50 are provided between the biased portions 42 of the first holder member 40 and the first spring attachment portions 36, and between the biased portions 47 of the second holder member 45 and the second spring attachment portions 37, respectively. The upper ends of the springs 50 make contact with the lower surfaces of the biased portions 42 and biased portions 47. The lower ends of the springs 50 are retained on the first spring attachment portions 36 and the second spring attachment portions 37.

As shown in FIG. 5, the upper ends of the springs 50 are positioned below the contact glass 16 and above the lower surface of the image sensor 20 contained in the sensor container 31. Further, the first spring attachment portions 36 retaining the lower ends of the springs 50 are positioned above the lower surface of the image sensor 20 in the sensor container 31. Therefore, between the biased portions 42 of the first holder member 40 and the first spring attachment portions 36, the springs 50 can bias the image sensor 20 along with the first holder member 40 upward to the contact glass 16. Further, the same positional relation also adapts to the other springs 50 between the biased portions 47 of the second holder member 45 and the second spring attachment portions 37. Therefore, the other springs 50 can bias the image sensor 20 along with the second holder member 45 upward to the contact glass 16.

Then, as shown in FIG. 4, spacer members 60 are installed on the front end portion and the rear end portion of the image sensor 20, respectively, such that a part of each of the spacer members 60 is positioned upon the reading surface 21 of the image sensor 20. Therefore, the spacer members 60 is interposed between the reading surface 21 of the image sensor 20 and the lower surface of the contact glass 16. That is, according to the multifunction apparatus 1, since the spacer members 60 make contact with the lower surface of the contact glass 16, it is possible to keep an appropriate distance between the contact glass 16 and the reading surface 21 of the image sensor 20. Thereby, it is possible for the image sensor 20 to maintain the reading quality.

Next, referring to FIGS. 8 to 10, explanations will be made in detail with respect to the states of the image sensor 20 and the carriage 30 in a case that the carriage is swung about the slide shaft 25. First, referring to FIG. 8, explanations will be given for a case in which the carriage 30 is in a horizontal state.

As shown in FIG. 8, in a case that the carriage 30 is in a horizontal state, the image sensor 20 maintains its horizontal state in the sensor container 31, and thus the reading surface 21 is in a state parallel to the contact glass 16. At this time, a part of the front end portion of the image sensor 20 is positioned below the carriage 30 via the first opening 34. A part of the rear end portion of the image sensor 20 is positioned below the carriage 30 via the second opening 35. That is, in the horizontal state, a part of each end portion of the image sensor 20 projects downward below the carriage 30 through either the first opening 34 or the second opening 35 of the carriage 30.

Next, referring to FIG. 9, explanations will be given in detail for a case in which the carriage 30 is in a first inclined state. The first inclined state means a state in which the carriage 30 has swung about the slide shaft 25 such that the first taper end portion 32 moves upward and the second taper end portion 33 moves downward.

As shown in FIG. 9, if the carriage 30 swings about the slide shaft 25 and comes into the first inclined state, then the front end portion of the image sensor 20 projects further downward via the first opening 34 of the first taper end portion 32. Therefore, more part of the front end portion of the image sensor 20 is positioned below the carriage 30 as compared with the state shown in FIG. 8. On the other hand, in this case, the rear end portion of the image sensor 20 projects upward through the second opening 35 of the second taper end portion 33 due to the biasing force of the springs 50 via the second holder member 45. Therefore, as shown in FIG. 9, even when the carriage 30 is in the first inclined state, the image sensor 20 can still keep the reading surface 21 in the horizontal state.

Further, when the carriage 30 is in the first inclined state, the second taper end portion 33 of the carriage 30 has moved below as compared with the horizontal state shown in FIG. 8. The second taper end portion 33 is formed such that the dimension of the carriage 30 in height becomes smaller as getting closer to the rear end side from the central portion in the longitudinal direction. The lower-end edge of the second taper end portion 33 is inclined upward toward the rear end side with respect to the reference line L. Therefore, as shown in FIG. 9, even when the carriage 30 is in the first inclined state, the second taper end portion 33 is still positioned above the reference line L. That is, according to the multifunction apparatus 1, even in the first inclined state, the carriage 30 does not occupy any space below the reference line L. As a result, since the space below the reference line L in the multifunction apparatus 1 can be used effectively, it is possible to facilitate apparatus miniaturization for the multifunction apparatus 1.

Next, referring to FIG. 10, explanations will be given in detail for a case in which the carriage 30 is in a second inclined state. Here, the second inclined state means a state in which the carriage 30 has swung about the slide shaft 25 such that the first taper end portion 32 moves downward and the second taper end portion 33 moves upward.

As shown in FIG. 10, if the carriage 30 swings about the slide shaft 25 and comes into the second inclined state, then the rear end portion of the image sensor 20 projects further downward via the second opening 35 of the second taper end portion 33. Therefore, more part of the rear end portion of the image sensor 20 is positioned below the carriage 30 as compared with the state shown in FIG. 8. On the other hand, in this case, the front end portion of the image sensor 20 projects upward through the first opening 34 of the first taper end portion 32 due to the biasing force of the springs 50 via the first holder member 40. Therefore, as shown in FIG. 10, even when the carriage 30 is in the second inclined state, the image sensor 20 can still keep the reading surface 21 in the horizontal state.

Further, when the carriage 30 is in the second inclined state, the first taper end portion 32 of the carriage 30 has moved below as compared with the horizontal state shown in FIG. 8. The first taper end portion 32 is formed such that the dimension of the carriage 30 in height becomes smaller as getting closer to the front end side from the central portion in the longitudinal direction. The lower-end edge of the first taper end portion 32 is inclined upward toward the front end side with respect to the reference line L. Therefore, as shown in FIG. 10, even when the carriage 30 is in the second inclined state, the first taper end portion 32 is still positioned above the reference line L. That is, according to the multifunction apparatus 1, even in the second inclined state, the carriage 30 does not occupy any space below the reference line L. As a result, since the space below the reference line L in the multifunction apparatus 1 can be used defectively, it is possible to facilitate apparatus miniaturization for the multifunction apparatus 1.

As described above, in the multifunction apparatus 1 according to the present embodiment, the carriage 30 is formed with the first taper end portion 32 and the second taper end portion 33. Accordingly, as shown in FIGS. 8 to 10, even when the carriage 30 has swung about the slide shaft 25, the carriage 30 does not occupy any space below the reference line L. Therefore, according to the multifunction apparatus 1, it is possible to effectively utilize the space below the reference line L and it is possible to facilitate miniaturization of the multifunction apparatus 1.

In the multifunction apparatus 1, the first opening 34 is formed in the first taper end portion 32. The first holder member 40 and the springs 50 are attached to the first taper end portion 32. Further, the second opening 35 is formed in the second taper end portion 33. The second holder member 45 and the other springs 50 are attached to the second taper end portion 33. Therefore, according to the multifunction apparatus 1, as shown in FIGS. 8 to 10, even if the carriage 30 swings about the slide shaft 25, it is still possible to keep the reading surface 21 of the image sensor 20 horizontal with respect to the contact glass 16. Hence, it is possible for the multifunction apparatus 1 to maintain the quality of reading images.

Figure 3:
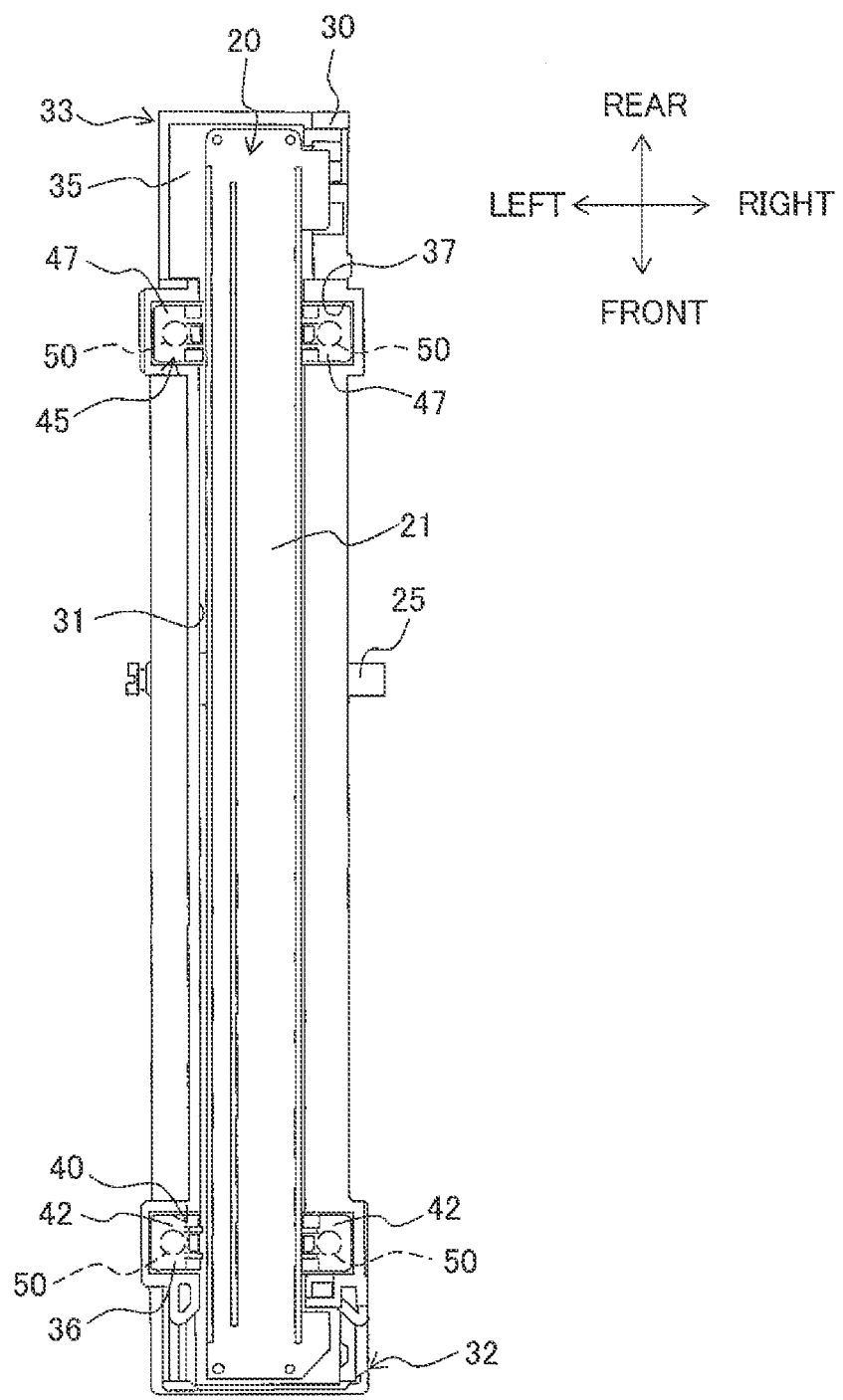
FIG. 3 is a plan view of an image sensor installed on a carriage of the multifunction apparatus.

Further, in the multifunction apparatus 1, the biased portions 42 of the first holder member 40 and the biased portions 47 of the second holder member 45 are adjacent to the reading surface 21 of the image sensor 20 in the sensor container 31 in the left-right direction. Then, between the biased portions 42 and the first spring attachment portions 36, and between the biased portions 47 and the second spring attachment portions 37, the springs 50 bias the biased portions 42 and the biased portions 47 upward, respectively. Therefore, as shown in FIGS. 3 to 5, in the multifunction apparatus 1 according to this embodiment, the springs 50 are not positioned between the lower surface of the image sensor 20 and the sensor container 31. As a result, it is possible for the multifunction apparatus 1 to reduce the vertical dimension of the image sensor 20 and carriage 30. Hence, it is possible to facilitate miniaturization of the apparatus in the up-down direction.

Further, as shown in FIG. 3, when viewed from upside of the reading surface 21 of the image sensor 20 in the sensor container 31, the biased portions of the present invention are adjacent to the reading surface 21. That is, as long as this condition is satisfied, the biased portions may be positioned at any position in the up-down direction with respect to the reading surface 21 of the image sensor 20. For example, as long as the above condition is satisfied, the biased portions may be positioned either above the reading surface 21 or below the reading surface 21. Further, the biased portions may also be at the same height with the reading surface 21.

Further, the biased portions 42 of the first holder member 40 and the biased portions 47 of the second holder member 45 are adjacent to the reading surface 21 of the image sensor 20 in the sensor container 31 in the left-right direction. The biased portions 42 of the first holder member 40 and the biased portions 47 of the second holder member 45 are biased upward by the springs 50. That is, according to the multifunction apparatus 1, it is possible to balance the biasing force of the springs 50 for the image sensor 20 in the left-right direction. Therefore, it is possible to bias the reading surface 21 of the image sensor 20 toward the contact glass 16 in an appropriate state, i.e., being kept in a horizontal state.

Based on the embodiment, the present invention was described above. However, the present invention is not limited in any way to the embodiment described above, but can undergo various modifications and changes without departing from the gist and scope of the present invention. For example, in the above embodiment, an example is shown by the multifunction apparatus 1 having a scanner function, a photocopy function, a printer function, and a facsimile function. However, the present invention is not limited to this aspect. It is possible to apply the present invention to any scanner apparatuses or photocopy machines which have at least a scanner unit of the flatbed type.

Further, in the above embodiment, the biased portions of the holder member are biased upward by the springs so as to bias the image sensor supported by the holder member toward the contact glass. However, the present invention is not limited to this aspect. For example, in the upper portions of the side surfaces of the image sensor, biased portions may be formed to extend horizontally in outward directions from the image sensor. In this case, by exerting the biasing force of the springs on the biased portions formed integrally with the image sensor, the image sensor may also be biased toward the contact glass.

That is, the biased portions of the present invention may be configured to first receive the biasing force of a biasing member at positions adjacent to the reading surface of the image sensor, and then exert the biasing force to bias the image sensor toward the contact glass. Therefore, as described above, the biased portions of the present invention include the biased portions formed integrally with the image sensor. Further, as in the embodiment described above, it is a matter of course that the biased portions also include with the biased portions which is formed in other members different from the image sensor.

Then, in the above embodiment, the first taper end portion 32, the first opening 34, the first holder member 40, and some of the springs 50 are provided in one end portion of the carriage 30 in the longitudinal direction. The second taper end portion 33, the second opening 35, the second holder member 45, and the other springs 50 are provided in the other end portion. However, the present invention is not limited to this aspect. It may also be configured to provide a taper end, an opening, biased portions, and a biasing member in at least one end portion of the carriage in the longitudinal direction, and such configuration is included in the invention according to claim 1 of the present application.

Further, in the above embodiment, as shown in FIGS. 8 to 10, in each of the horizontal state, the first inclined state and the second inclined state, at least one end portion of the image sensor 20 enters under the carriage 30 via either the first opening 34 or the second opening 35. However, the present invention is not limited to this aspect. The present invention includes any configurations such that in any one of the horizontal state, the first inclined state and the second inclined state, an end portion of the image sensor enters under the carriage via an opening. For example, the present invention includes the configuration that no end portion of the image sensor enters under the carriage via the opening in the horizontal state, but an end portion of the image sensor enters under the carriage via the opening in the first inclined state and/or in the second inclined state.

What is claimed is:

1. An image reading apparatus configured to read an image of a manuscript, the apparatus comprising:
   a main body;
   a contact glass provided at an upper surface of the main body to set the manuscript thereon;
   an image sensor provided on a side opposite to a surface of the contact glass on which the manuscript is set, the image sensor extending in a first direction and having a reading surface which faces the contact glass to read the image from the manuscript on the contact glass;
   a rail member extending inside the main body in a second direction perpendicular to the first direction;
   a carriage which is supported by the rail member to be slidable along the second direction and contains the image sensor in a sensor container having a recess open to a contact glass side, the carriage being supported to be swingable about the rail member at a central portion thereof in the first direction, and having a taper end portion which is formed in an end portion thereof on one end side in the first direction to be smaller in height toward the one end side;
   a first biased portion which is provided on the one end side in the first direction with respect to the carriage, and which is adjacent to the reading surface of the image sensor;
   a second biased portion which is provided on the one end side in the first direction with respect to the carriage, and which is adjacent to the reading surface of the image sensor,
   a first biasing member provided between the first biased portion and the carriage to bias the image sensor toward the contact glass via the first biased portion; and
   a second biasing member provided between the second biased portion and the carriage to bias the image sensor toward the contact glass via the second biased portion.

2. The image reading apparatus according to claim 1, wherein the first biasing member and the second biasing members are springs.

3. The image reading apparatus according to claim 1, wherein the first biasing member and the second biasing members are positioned above a bottom of the image sensor.

4. The image reading apparatus according to claim 1, wherein the rail member is a shaft.

5. The image reading apparatus according to claim 1, wherein the image sensor is pivotable about the rail member.

6. An image reading apparatus configured to read an image of a manuscript, the apparatus comprising:
   a main body;
   a contact glass provided at an upper surface of the main body to set the manuscript thereon;
   an image sensor provided on a side opposite to a surface of the contact glass on which the manuscript is set, the image sensor extending in a first direction and having a reading surface which faces the contact glass to read the image from the manuscript on the contact glass;
   a rail member extending inside the main body in a second direction perpendicular to the first direction;
   a carriage which is supported by the rail member to be slidable along the second direction and contains the image sensor in a sensor container having a recess open to a contact glass side, the carriage being supported to be swingable about the rail member at a central portion thereof in the first direction, and having a taper end portion which is formed in an end portion thereof on one end side in the first direction to be smaller in height toward the one end side;
   a first biased portion which is provided on the one end side in the first direction with respect to the carriage, and which is separate, in the second direction, from the reading surface of the image sensor;
   a second biased portion which is provided on the one end side in the first direction with respect to the carriage, and which is separate, in a third direction opposite to the second direction, from the reading surface of the image sensor;
   a first biasing member provided between the first biased portion and the carriage to bias the image sensor toward the contact glass via the first biased portion; and
   a second biasing member provided between the second biased portion and the carriage to bias the image sensor toward the contact glass via the second biased portion.

7. The image reading apparatus according to claim 6, wherein the first biasing member and the second biasing members are springs.

8. The image reading apparatus according to claim 6, wherein the first biasing member and the second biasing members are positioned above a bottom of the image sensor.

9. The image reading apparatus according to claim 6, wherein the rail member is a shaft.

10. The image reading apparatus according to claim 6, wherein the image sensor is pivotable about the rail member.

11. An image reading apparatus configured to read an image of a manuscript, the apparatus comprising:
- a main body;
- a contact glass provided at an upper surface of the main body to set the manuscript thereon;
- an image sensor provided on a side opposite to a surface of the contact glass on which the manuscript is set, the image sensor extending in a first direction and having a top portion;
- a rail member extending inside the main body in a second direction perpendicular to the first direction;
- a carriage which is supported by the rail member to be slidable along the second direction and contains the image sensor in a sensor container having a recess open to a contact glass side, the carriage being supported to be swingable about the rail member at a central portion thereof in the first direction, and having a taper end portion which is formed in an end portion thereof on one end side in the first direction to be smaller in height toward the one end side;
- a first biased portion which is provided on the one end side in the first direction with respect to the carriage, and which is separate, in the second direction, from the top portion of the image sensor,
- a second biased portion which is provided on the one end side in the first direction with respect to the carriage, and which is separate, in a third direction opposite to the second direction, from the top portion of the image sensor;
- a first biasing member provided between the first biased portion and the carriage to bias the image sensor toward the contact glass via the first biased portion; and
- a second biasing member provided between the second biased portion and the carriage to bias the image sensor toward the contact glass via the second biased portion.

12. The image reading apparatus according to claim 11, wherein the first biasing member and the second biasing members are springs.

13. The image reading apparatus according to claim 11, wherein the first biasing member and the second biasing members are positioned above a bottom of the image sensor.

14. The image reading apparatus according to claim 11, wherein the rail member is a shaft.

15. The image reading apparatus according to claim 11, wherein the image sensor is pivotable about the rail member.

* * * * *